United States Patent
Bobba et al.

(10) Patent No.: US 8,710,671 B2
(45) Date of Patent: Apr. 29, 2014

(54) MULTI-LEVEL INTEGRATED CIRCUIT, DEVICE AND METHOD FOR MODELING MULTI-LEVEL INTEGRATED CIRCUITS

(75) Inventors: Shashikanth Bobba, Visakhapatnam (IN); Olivier Thomas, Revel (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 103 days.

(21) Appl. No.: 13/335,213

(22) Filed: Dec. 22, 2011

(65) Prior Publication Data

US 2012/0161329 A1 Jun. 28, 2012

(30) Foreign Application Priority Data

Dec. 23, 2010 (EP) .................................. 10306503

(51) Int. Cl.
*H01L 23/48* (2006.01)
*H01L 23/538* (2006.01)

(52) U.S. Cl.
USPC ........... 257/774; 257/737; 257/738; 257/773; 257/778; 257/E21.575; 257/E23.01; 438/618; 716/119

(58) Field of Classification Search
USPC .......... 257/737, 738, 773, 774, 778, E21.575, 257/E23.01; 438/618; 716/119
See application file for complete search history.

(56) References Cited

U.S. PATENT DOCUMENTS

| | | | |
|---|---|---|---|
| 2010/0155783 A1 | 6/2010 | Law et al. | |
| 2010/0188060 A1 | 7/2010 | Malek-Khosravi et al. | |
| 2010/0196803 A1 | 8/2010 | Lu et al. | |
| 2010/0205571 A1 | 8/2010 | Manohar et al. | |
| 2012/0038057 A1* | 2/2012 | Bartley et al. | 257/774 |
| 2012/0074584 A1* | 3/2012 | Lee et al. | 257/774 |
| 2012/0074585 A1* | 3/2012 | Koo et al. | 257/774 |

FOREIGN PATENT DOCUMENTS

EP 0 651 341 A2 5/1995

* cited by examiner

*Primary Examiner* — Dao H Nguyen
(74) *Attorney, Agent, or Firm* — Oblon, Spivak, McClelland, Maier & Neustadt, L.L.P.

(57) ABSTRACT

A multi-level integrated circuit, having a superposition of a first stack and a second stack of layers, and including a first row of electronic devices produced in the first stack, extending parallel to a first direction and fitting into a first volume with a substantially parallelepiped rectangle shape and having edges perpendicular to the first direction and with dimension $H_1$; a second row of electronic devices produced in the second stack, extending parallel to the first direction and fitting into a second volume with a substantially parallelepiped rectangle shape and having edges perpendicular to the first direction and with dimension $H_2<H_1$; and a plurality of electrical connection elements passing through the second stack of layers, each connection element fitting into a third volume arranged on the first volume and next to the second volume.

18 Claims, 6 Drawing Sheets

MULTI-LEVEL INTEGRATED CIRCUIT, DEVICE AND METHOD FOR MODELING MULTI-LEVEL INTEGRATED CIRCUITS

TECHNICAL FIELD

The invention concerns the field of electronic integrated circuits, in particular that of multi-level, or three-dimensional, integrated circuits, i.e. in which the electronic components of these integrated circuits are made on several levels, or several active layers, superimposed one above the other.

The invention also concerns the field of tools, for example software tools, to assist in producing such integrated circuits, and in particular a device and a method for the conception of multi-level integrated circuits.

BACKGROUND OF THE INVENTION

The production of current electronic integrated circuits, which can include a very large number of electronic components, is generally done using computer-aided design software (CAD Tool) making it possible to modelise the different elements of those circuits and making it possible, in a final step, to generate a set of computer files which will be used to produce masks, such as lithography masks. These masks will further on be used during the manufacturing of such integrated circuits.

Such software use one or several libraries of standard cells corresponding to electronic devices. A library of cells dedicated to the realisation of digital logic circuits generally includes cells performing a more or less complex logic function (AND, OR, NOT, . . . logic gate) or an information storage function (latches).

Usually, in a library, several descriptions and models of each cell are available in the form of different files used by the various software tools during the software design method of an integrated circuit.

Each cell in particular includes a physical description (layout) of the electronic device represented by the cell, i.e. the arrangement of the various elements forming the active and/or passive components of the electronic device, for example several transistors, the internal electrical connections between those components and connection elements connected to the inputs and outputs of the electronic device.

Each cell has also associated descriptions of its electrical behavior, generally by way of different files precising timing, power or other features.

During the integrated circuit manufacturing, electronic devices are made in a stack of layers comprising a semiconductor layer. For example, when the electronic device is a logic gate comprising several transistors, the active zones (source, drain, channel) of the transistors are formed by doped regions of said semiconductor layer. The semiconductor layer is covered with at least one dielectric layer in which electrically conductive portions are arranged. The connections can be internal electrical connections connecting the various components of the electronic device to one another. These connections can also connect, via connection elements passing through the dielectric layer, the inputs and outputs of the electronic device to electrically conductive input and output contacts, for example metal ones, arranged above the dielectric layer. Some other conductive portions are made in upper dielectric layers to realize interconnections between electrical devices of the integrated circuit.

One of the steps of the CAD conception of electronic integrated circuits uses a place-and-route software. This place-and-route software in particular uses computer files providing the physical description, or representation, of all or part of each cell represented in two dimensions (2D) (e.g. "layout" files). The role of this place-and-route software is to position the 2D physical representations of the cells of the integrated circuit to be manufactured alongside each other, in a same plane.

In practice, the components of each cell fit, after physical manufacturing of the circuit, into a portion of the stack of layers making up the circuit generally a rectangle parallelepiped portion. The 2D physical description of each cell substantially corresponds to a "projection" of the elements making up the components of the cell on a same rectangular surface parallel to the top surface of the integrated circuit. The surfaces of the "projected" elements correspond for example to the surface occupied by the active zones of the semiconductor layer, the surface occupied by the electrically conductive portions arranged in the dielectric layer, the surface of the polysilicon portions deposited on the semiconductor layer and forming the gates of the transistors, etc. All the surfaces corresponding to an element projection are inside a rectangle surface delimited by a boundary rectangle.

One of the dimensions of this boundary, generally the height, is identical for all of the cells of a same library. Indeed, the cells are placed next to each other to form rows of cells, all the rows having the same height. The other dimension of this boundary, for example the width, varies for each cell as a function of the complexity of the associated electronic device, this complexity for example being related to the number of transistors and internal electrical connections of the electronic device.

Figure 1:
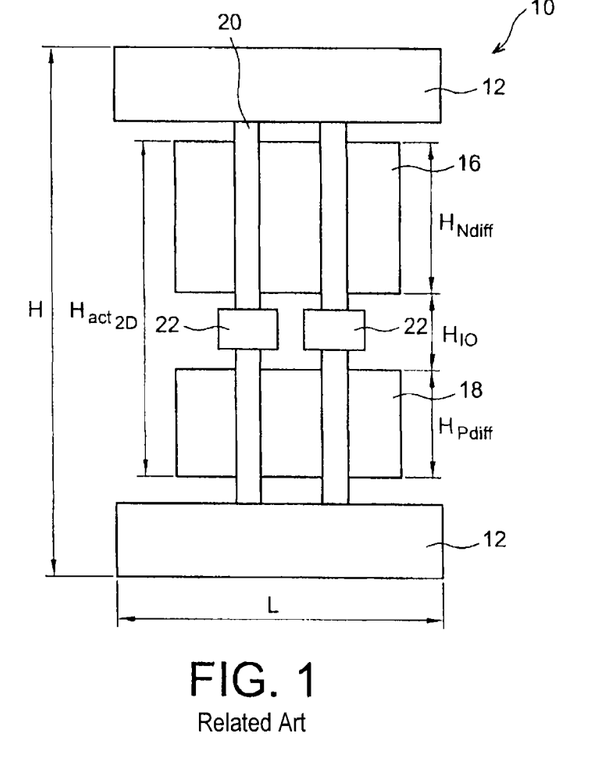
FIG. 1 shows an example of a layout of a standard cell.

One example of layout of such a cell 10 is shown in FIG. 1. This cell 10 occupies an area with width L, and height H similar to the height of the other cells of the library to which the cell 10 belongs. In a given library, the height H is generally defined from the most complex cell (for example a latch). This area is defined on top and on bottom by electrically conductive electrical power lines 12, one for example being intended to be connected to a power voltage and the other one connected to the mass.

The cell 10 includes a first P doped active zone 16, with height $H_{Ndiff}$, in which NMOS transistors are made and a second N doped active zone 18, with height $H_{Pdiff}$, in which PMOS transistors are made (the doping type of the active zones corresponding to the doping type of the transistor channel). The cell 10 also includes polysilicon portions 20 deposited on the active zones 16 and 18 and forming gates common to the PMOS and NMOS transistors made in the active zones 16 and 18. Lastly, the cell 10 also includes electrical connection elements 22 extending perpendicular to the plane of the surface with width L and height H of the cell, intended to be electrically connected to input/output contacts of the electronic device. These connection elements 22 here produce an electrical connection between the gates of the transistors of the cell 10 and the input/output contacts, and are formed between the active zones 16 and 18, in a reserved zone with height $H_{IO}$.

The different elements of the cell 10 (electrical power lines 12, active zones 16 and 18, connection elements 22) are spaced apart from each other to avoid any short circuit between them.

Figure 2:
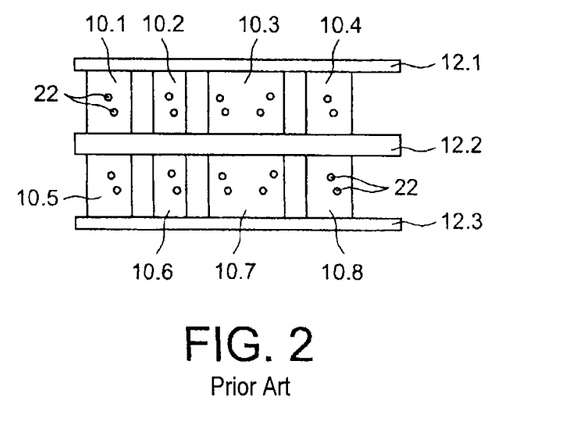
FIG. 2 diagrammatically illustrates a portion of two rows of cells corresponding to electronic devices of an integrated circuit according to the prior art.

In the place-and-route software, the layouts of the cells are arranged next to each other forming several rows of cells parallel to each other. FIG. 2 illustrates several cells arranged in two parallel rows. In this FIG. 2, four first cells 10.1 to 10.4 are arranged next to each other forming a first row and four second cells 10.5 to 10.8 are arranged next to each other forming a second row. Electrical power lines 12.1 to 12.3 are made continuously for each row of cells and are therefore shared by all of the cells of a same row. Moreover, the electrical power lines can be shared by two adjacent rows of cells. Thus, in the example of FIG. 2, the electrical power line 12.2 shared by the first and second rows is for example electrically connected to the mass. The electrical power lines 12.1 and 12.3 are electrically connected to the supply voltage and may be shared with other adjacent rows of cells not shown in FIG. 2.

Each cell 10.1 to 10.4 also includes connection elements 22 arranged between the power lines 12.1 and 12.2. Likewise, each cell 10.5 to 10.8 includes connection elements 22 arranged between the power lines 12.2 and 12.3 of said cells.

In order to densify the integrated circuits, it is known to produce three-dimensional integrated circuits on several levels, each level being able to correspond to a stack of layers comprising a semiconductor layer covered with a dielectric layer in which electrically conductive portions are arranged intended to form electrical interconnections.

A first manner to manufacture such integrated circuits, called parallel 3D integration, consists in assembling 2 or more integrated circuits made separately, each circuit being made using a standard CAD flow. The different circuits are electrically connected to one another through electrically conductive vias formed beforehand, for example using TSV ("Through Silicon Via") technology through the different levels.

Parallel 3D integration has several drawbacks. First of all, this type of integration is costly to carry out. Moreover, the electrically conductive vias necessary to realize the electrical connections between the different levels of the integrated circuit are very bulky, this bulk generally being between about 5 μm and 10 μm. Lastly, the alignments done between the levels are not very precise, which limits this integration to the superposition of complex circuits or functional blocks that do not require very precise alignment.

A second way of manufacturing three dimensional integrated circuits, called 3D monolithic integration uses "3D" standard cells corresponding to electronic devices in which the components, for example the transistors, of each electronic device are distributed over two or more levels, and more particularly inside or on two distinct semiconducting layers.

Figure 3:
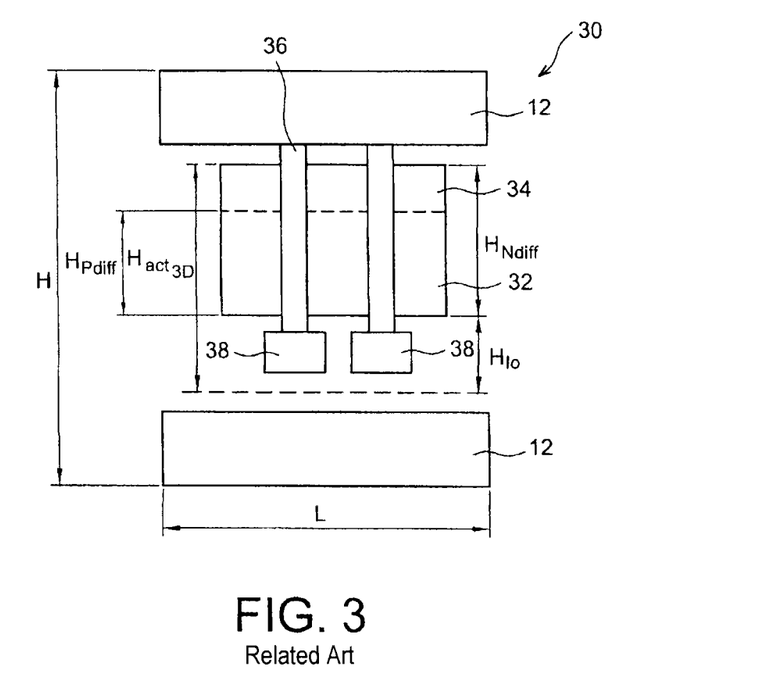
FIG. 3 shows an example of a layout of a 3D standard cell produced on two levels.

An example of the layout of such a 3D standard cell 30 is shown in FIG. 3. The cell 30 here comprises the same structural elements as the cell 10 previously described. The 3D cell 30 occupies a surface with width L and height H. As for the cell 10 previously described, the area occupied by the cell 30 is delimited on top and on bottom by the electrical power lines 12.

The cell 30 includes a first N doped active zone 32, with height $H_{Pdiff}$, in which PMOS transistors are produced, and a second P doped active zone 34, with height $H_{Ndiff}$, in which NMOS transistors are produced. The first N doped active zone 32 is made in a first semiconductor layer that is part of a first stack of layers, the second P doped active zone 34 being produced in a second semiconductor layer that is part of a second stack of layers arranged above the first stack of layers.

The cell 30 also includes polysilicon portions 36 deposited on the second semiconductor layer and forming NMOS transistor gates (the cell 30 also includes polysilicon portions, not shown in FIG. 3, deposited on the first semiconductor layer and forming PMOS transistor gates). Lastly, the cell 30 also includes connection elements 38 extending perpendicular to the plane of the surface of the cell 30 with width L and height H intended to be electrically connected to input/output contacts of the electronic device represented by the cell 30 that are placed above the second stack of layers. These connection elements 38 are electrically connected to the polysilicon portions 36, and are placed between the active zones 32, 34 and the metal supply line 12 located at the bottom of the cell 30, in a reserved zone with height $H_{IO}$.

Such a 3D standard cell 30 can be seen as corresponding to the standard cell 10 that would be "folded" in 2, by arranging all of the NMOS transistors above the PMOS transistors of the cell 30. The height $H_{act3D}$ necessary to realize active zones of said cell 30 is smaller than the height $H_{act2D}$ of the cell 10 previously described.

In the following description, we will call "2D" cell, an electronic device having components manufactured on or inside a unique semiconductor layer, and "3D" cell, an electronic device having components manufactured on or inside 2 or more semiconductor layers.

The design of an integrated circuit from 3D standard cells, using CAD tools, is similar to that produced from traditional 2D cells. In the place-and-route software, these 3D cells are therefore arranged in rows next to each other in a plane representing the two stacks of superimposed layers, similarly to FIG. 2.

BRIEF DESCRIPTION OF THE INVENTION

Thus there is a need to propose a new type of multi-level integrated circuit having the advantages of integrated circuits produced in three dimensions and that is less bulky than the integrated circuits designed from 3D standard cells.

To that end, one embodiment proposes a multi-level integrated circuit comprising a superposition of at least a first and second stacks of layers of materials and including at least:
- a first row of first electronic devices realized in the first stack, the first row extending parallel to a first direction and fitting into a first volume with a substantially parallelepiped rectangle shape corresponding to a portion of the first stack and having, in a first plane parallel to a contact surface between the first stack and the second stack, edges perpendicular to the first direction and with dimension $H_1$;
- a second row of second electronic devices realized in the second stack, the second row extending parallel to the first direction and fitting into a second volume with a substantially parallelepiped rectangle shape corresponding to a portion of the second stack, placed on the first volume (300) and having, in said first plane, edges perpendicular to the first direction and with dimension $H_2$ inferior to $H_1$;
- a plurality of electrical connection elements electrically connecting inputs and outputs of the first electronic devices of the first row to electrically conductive input/output contacts (258) arranged above the second stack, passing through the second stack of layers, each connection element fitting into a third volume (304) corresponding to a portion of the second stack and being placed on the first volume next to the second volume.

Relative to a traditional integrated circuit produced on a single level, this integrated circuit makes it possible to reduce the lengths of the electrical interconnections between electronic devices (between cells) because this arrangement on several levels of the electronic devices makes it possible to increase, for each electronic device, the number of neighboring devices that can potentially be electrically interconnected with this device. Thus, relative to a 2D integrated circuit in which each electronic device includes at most 8 neighboring electronic devices, each electronic device of the proposed 3D integrated circuit can include up to 17 neighboring electronic devices. This reduction of the lengths of the interconnections improves the performance of the integrated circuit, in particular the response time and the transmission times for signals within the integrated circuit.

Moreover, compared to an integrated circuit on a single level, the surface gain of this integrated circuit, realized on 2 levels (2 stacks) can achieve about 45%. This surface gain is higher than the surface gain of about 30% obtained by an integrated circuit on 2 levels realized with 3D standard cells.

In an embodiment, the second volume may be centered relative to the first volume and the electrical connection elements may be placed on each side of the second volume, along edges of the second volume parallel to the first direction.

In one alternative, the electrical connection elements may be placed on a single side of the second volume, along an edge of the second volume parallel to the first direction.

One, some or all of the electronic device of the integrated circuit, or at least one electronic device of each row, may be capable of performing a logic operation and/or storing data.

Each stack of layers of materials may comprise at least one semiconductor layer and a dielectric layer placed above the semiconductor layer.

At least one of the electronic device of each row may include at least one active zone formed in a semiconductor layer of the stack of layers in which it is realized.

At least one of the electronic device may include at least one electrically conductive portion forming an internal electrical connection between at least two electrical components of said electronic device and placed in a dielectric layer of the stack of layers in which the electronic device is realized.

The integrated circuit may also include electrical power lines arranged in the second volume and in a dielectric layer of the second stack of layers, each of the electronic devices of the first and second rows being electrically connected to said electrical power lines, said electrical power lines extending parallel to the first direction, near the edges of the second volume parallel to the first direction.

Each of the inputs and outputs of the second electronic devices of the second row may be electrically connected to at least one electrically conductive input/output contact arranged above the second stack, via a connection element passing through at least one dielectric layer of the second stack.

The integrated circuit may also include at least one third electronic device including at least one elementary electronic components placed in the first volume and at least one elementary electronic components placed in the second volume. Thus, it is possible to produce an integrated circuit including electronic devices made from 2D standard cells distributed over the two levels, but also one or several electronic devices produced from standard 3D cells. "Elementary electronic components" refers to the electronic components serving as basic elements to produce the electronic devices, i.e. transistors, resistors, capacitors, etc.

The integrated circuit may include a plurality of parallel first rows of electronic devices and a plurality of parallel second rows of electronic devices, each of the second volumes in which the second rows of electronic devices fit being placed on one of the first volumes in which the first rows of electronic devices fit.

At least part of the electronic devices of two second rows adjacent to each other may be electrically connected to a same electrical power line.

The integrated circuit may also include one or several levels of electrical interconnections placed above the second stack and electrically connecting first and/or second electronic devices to one another.

It is also proposed a method for manufacturing a multi-level integrated circuit in a superposition of at least a first and second stack of layers of materials, including at least the following steps:

manufacturing a first row of first electronic devices in the first stack, the first row extending parallel to a first direction and fitting in a first volume with a substantially parallelepiped rectangle shape corresponding to a portion of the first stack and having, in a first plane parallel to a contact surface between the first stack and the second stack, edges perpendicular to the first direction and with dimension $H_1$;

manufacturing a second row of second electronic devices in the second stack, the second row extending parallel to the first direction and fitting into a second volume with a substantially parallelepiped rectangle shape corresponding to a portion of the second stack, placed on the first volume and having, in said first plane, edges perpendicular to the first direction and with dimension $H_2$ inferior to $H_1$;

manufacturing a plurality of electrical connection elements electrically connecting inputs and outputs of the first electronic devices of the first row to electrically conductive input/output contacts placed above the second stack, passing through the second stack of layers, each connection element fitting into a third volume corresponding to a portion of the second stack and being placed on the first volume next to the second volume.

It is also proposed a software conception method of a multi-level integrated circuit, according to one of the previously described embodiments, using a standard cells library defining a first version of at least one cell for which the components are placed in a first stack of layers, and a second version of at least one cell for which the components are placed in a second stack of layers, all cells having at least one physical description defining a boundary of the cell in a plane, all versions of one cell corresponding to electronic components having a same functionality;

comprising at least the following steps of:

a—reducing, by a factor k superior to 1, the initial surface of each standard cell defined by its boundary;

b—placing on a plane in at least one row, cells corresponding to the electronic devices of the integrated circuit using the reduced surface of the standard cells;

c—extending, by factor k, the surfaces of the cells previously placed;

d—distributing the cells on the different levels of the multi-level integrated circuit in at least one first row of cells in the first stack and at least one second row of cells in the second stack.

The distribution of the cells on the different levels may include a step of detection of overlaps between neighboring cells, and distribution of neighboring cells overlapping on different levels.

It is also proposed a conception device of a multi-level integrated circuit as previously defined, including software tools that can implement at least one of the steps a, c or d of the above method.

Lastly, it is also proposed a computer program product storing executable code for implementing at least one of the steps a, c or d of the method described above.

BRIEF DESCRIPTION OF THE DRAWINGS

The present invention will be better understood upon reading the description of example embodiments provided purely for information and non-limitingly in reference to the appended drawings, in which.

Identical, similar or equivalent parts of the different figures described hereinafter bear the same numerical references so as to facilitate the transition from one figure to the next.

The different parts shown in the figures are not necessarily shown using a uniform scale, to make the figures more legible.

The different possibilities (alternatives and embodiments) are not mutually exclusive and can be combined with each other.

DETAILED DESCRIPTION OF SPECIFIC EMBODIMENTS

The production of a multi-level integrated circuit will now be described according to a particular embodiment, in which the electronic devices forming the integrated circuit are distributed over several levels. This integrated circuit is intended to be modeled from standard cells in two dimensions distributed over several levels.

Contrary to the 3D standard cells of the prior art corresponding to electronic devices each produced on two levels, for example distributing the NMOS transistors on a first level and the PMOS transistors on a second level, each electronic device corresponding to a standard cell here is produced on a single level, i.e. in a single stack of layers including at least one semiconductor layer in which the active zones of the device are produced, a dielectric layer covering the semiconductor layer and electrical connections internal to the device formed by electrically conductive portions arranged in the dielectric layer.

Figure 4:
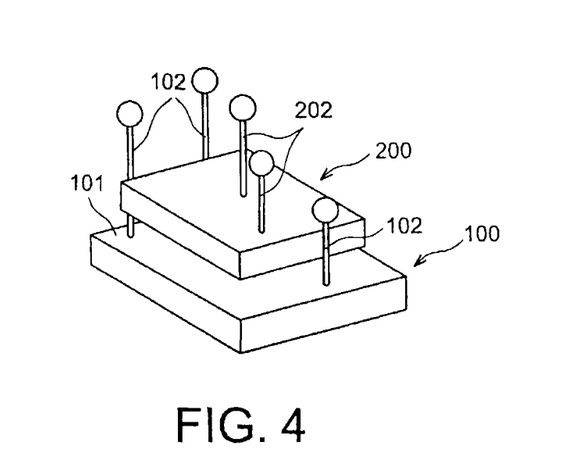
FIGS. 4 and 5 show a three-dimensional view and a top view, respectively, of two standard cells corresponding to two electronic devices of a multi-level integrated circuit according to a particular embodiment.
Figure 5:
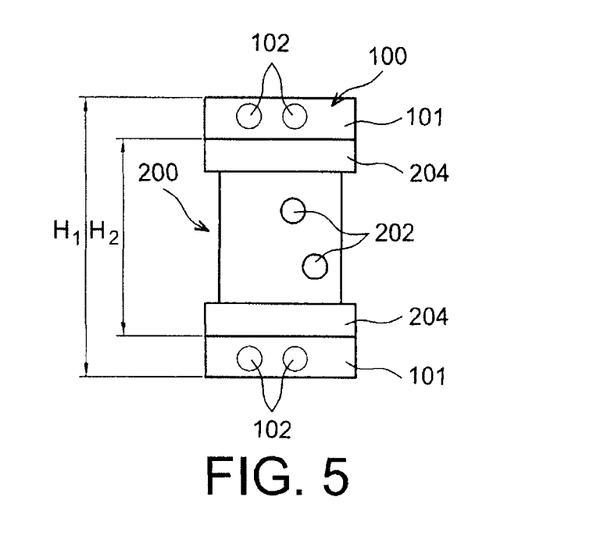

FIGS. 4 and 5 show a three-dimensional view and a top view, respectively, of two standard cells 100 and 200 corresponding to two electronic devices intended to be produced in two superimposed stacks of layers of such a multi-level integrated circuit, which are superimposed one above the other. In the example described here, the cell 200 is arranged on an upper level, while the cell 100 is arranged on a lower level. The height $H_2$ of the rectangular area occupied by the cell 200 on the upper level is delimited, on top and bottom, by electrical power lines 204, similarly to the standard cells 10 and 30 previously described. The cell 200 also includes, like the cell 10, electrical connection elements 202 arranged between the electrical power lines 204 and intended to be connected to electrically conductive input/output contacts, not shown in FIGS. 4 and 5, arranged above the cell 200. These electrical power lines 204 are also electrically connected to the cell 100.

However, FIGS. 4 and 5 show that the height $H_1$ of the cell 100 is larger than the height $H_2$ of the cell 200. The cell 100 includes end zones 101 that are not covered by the cell 200. Thus, connection elements 102 are produced at these end zones 101 and can, like the connection elements 202 of the cell 200, be electrically connected to electrically conductive input/output contacts arranged above the cell 200, while also preventing short circuits with the connection elements 202 of the cell 200.

Figure 6:
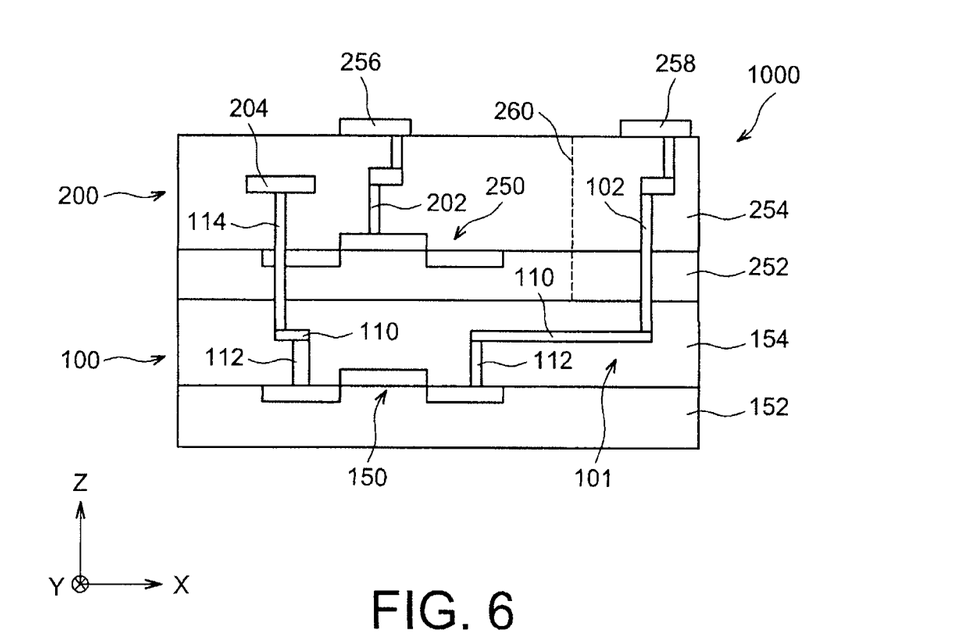
FIG. 6 diagrammatically shows a cross-sectional view of part of a multi-level integrated circuit according to a particular embodiment.

A diagrammatic cross-sectional view of a multi-level integrated circuit 1000 including electronic devices corresponding to those of the cells 100 and 200, i.e. the electronic devices produced with the lithography masks generated from computer files including the descriptions of the cells 100 and 200, is shown in FIG. 6.

In that figure, only part of the electronic devices is shown. A transistor 150 of the electronic device modeled by the cell 100 is produced in a first stack of layers including a first semiconductor layer 152 and a first dielectric layer 154 in which electrical connections 110 internal to the device of the cell 100 are produced. These internal electrical connections are produced in an intermediate metal level arranged in the dielectric layer 154. In the example of FIG. 6, a first internal electrical connection 110 is connected to an electrical power line 204 through a vertical electrical contact 114. This first internal electrical connection 110 is also connected to the transistor 150 through a vertical electrical contact 112.

This first stack of layers is covered by a second stack of layers in which the electronic device modeled by the cell 200 is produced, only a single transistor 250 of which is shown here. This second stack of layers includes a second semiconductor layer 252 covered with a second dielectric layer 254 in which electrical connections internal to the device of the cell 200 are produced. The transistor 250 is also electrically connected to the electrical power line 204 through a vertical electrical contact 114.

A connection element 202 passing through the second dielectric layer 254 electrically connects the gate of the transistor 250 to a first electrically conductive input/output contact 256 arranged on the second dielectric layer 254. A connection element 102, passing through the first dielectric layer 154 as well as the second stack of layers, electrically connects the transistor 150, through a second internal electrical connection 110 and a vertical electrical contact 112, to a second electrically conductive input/output contact 258 also arranged on the second dielectric layer 254. FIG. 6 shows that the connection element 102 passes through the second stack of layers outside the volume occupied by the device of the cell 200 whereof the delimitation is shown by the dash 260 corresponding to the border of the height $H_2$. The connection element 102 is formed in a zone 101 of the cell 100 not covered by the cell 200. Other dielectric layers in which upper electrical interconnection levels are formed, not shown in FIG. 6, are arranged above the second dielectric layer 254. The main faces of the different layers correspond to the faces parallel to the plane (X,Y).

Figure 7:
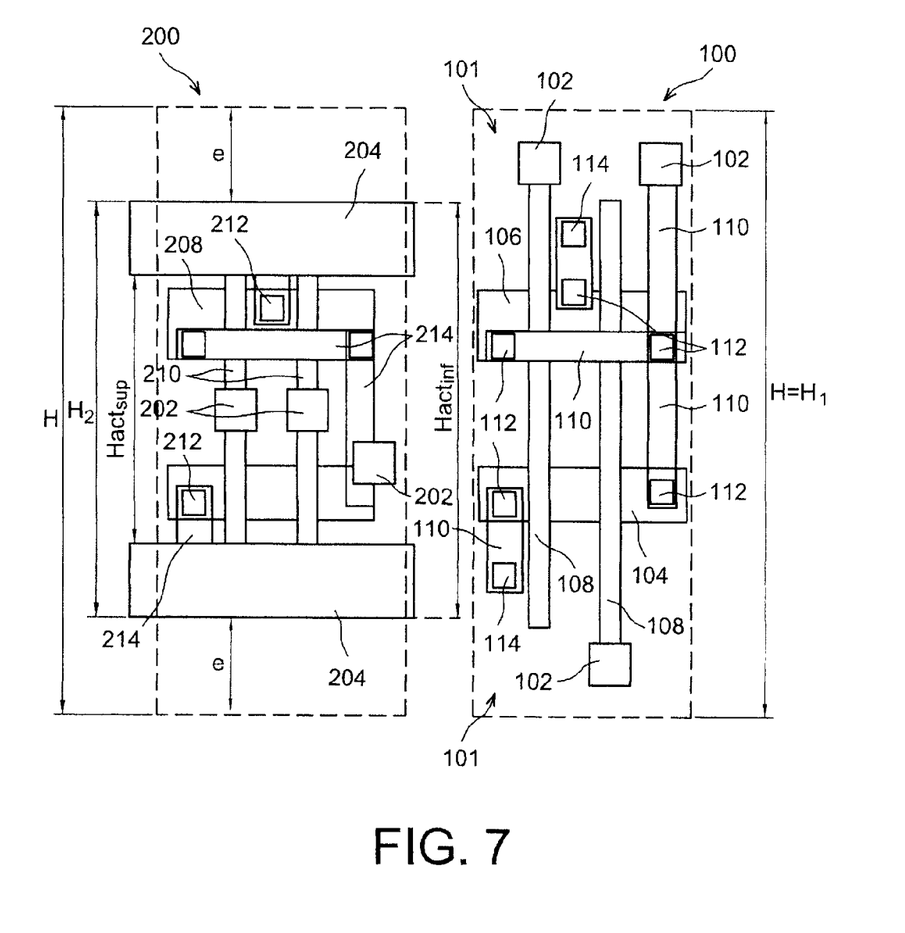
FIG. 7 shows examples of standard cells corresponding to electronic devices of a multi-level integrated circuit according to a particular embodiment.

FIG. 7 shows a detailed view of the standard cells 100 and 200. The electronic devices corresponding to each of the cells 100 and 200 form NAND logic gates with two inputs.

The cell 100 includes a first active zone 104 of the N type in which two PMOS transistors are produced, and a second active zone 106 of the P type in which two NMOS transistors are produced. These two active zones 104 and 106 are intended to be produced in the first semiconductor layer 152. The cell 100 also includes gates 108 shared by the NMOS and PMOS transistors and formed by polysilicon portions deposited on the first semiconductor layer 152. One end of each gate is electrically connected to one of the connection elements 102 electrically connecting two inputs of the NAND logic gate modeled by the cell 100 to electrically conductive input/output contacts intended to be produced above the cell 200, similar to the contact 258 previously described in connection with FIG. 6.

Internal electrical connections 110, forming the electrical cabling between the transistors of the NAND gate, are produced in an intermediate level of metal (for example tungsten-based) intended to be arranged, in the integrated circuit, between the active layers in which the cells 100 and 200 are intended to be produced. These electrical connections 110 are electrically connected to the transistors of the cell 100 by vertical electrical contacts 112. Another connection element 102 connects the output of the NAND logic gate modeled by the cell 100, through one of the internal electrical connections 110, to a metal input/output contact intended to be produced above the cell 200. Lastly, the cell 100 also includes vertical electrical contacts 114 intended to be electrically connected to the electrical power lines 204 of the cell 200.

As for the cell 100, the cell 200 includes a first active zone 206 of the N type in which two PMOS transistors are produced, and a second active zone 208 of the P type in which two NMOS transistors are produced, these active zones 206, 208 being intended to be produced in the second semiconductor layer 252. Gates 210 shared by the NMOS and PMOS transistors of the cell 200 are formed by polysilicon portions arranged on the second semiconductor layer 252. Unlike the connection elements 102 of the cell 100 that are connected to the ends of the gates 108, at a zone 101 of the cell 100 not covered by the cell 200, the cell 200 includes connection elements 202 connected to the two inputs of the NAND logic gate formed by the cell 200 and that are arranged between the diffusion zones 206 and 208.

The electrical power lines 204 are produced in the level of metal 1 of the integrated circuit and are electrically connected to the transistors of the cell 200 by vertical electrical contacts 212. Internal electrical connections 214 connected to the PMOS and NMOS transistors of the cell 200 are also produced in the level of metal 1 intended to be arranged, in the integrated circuit, in the dielectric layer 254. These internal electrical connections 214 are electrically connected to the transistors of the cell 200 by vertical electrical contacts 212. Another connection element 202, connected to the output of the NAND logic gate formed by the cell 200, is electrically connected to a metal input/output contact formed above the second dielectric layer 254.

We see that in the cell 200, the connection elements 202 connected to the inputs and outputs of the electronic device of the cell 200 pass through the second dielectric layer 254 between the metal supply lines 204. However, in the cell 100, the connection elements 102 connected to the inputs and outputs of the electronic device of the cell 100 pass through the first dielectric layer 154 as well as the second stack of layers outside and next to the volume occupied by the cell 200.

Given that each stack of layers has its own metal level to form the internal electrical connections of the devices (metal 1 for the upper stack and intermediate metal for the lower stack), any type of electronic device can be produced on either of the levels, the superimposed standard cells not having a particular functional connection to each other.

The cells 100 and 200 are standard cells in a library of standard cells used by integrated circuit modeling software. The heights of all of the standard cells in the library are identical. Thus, from the software perspective, the height H of the cell 100 is therefore similar to the height H of the cell 200. However, the height corresponding to the actual occupation area of the cell 200 is equal to $H_2$, which is smaller than the height H. In the cell 200, a free space e is kept between the electrical power lines 204 and the upper and lower boundaries of the surface of the cell 200 so that the connection elements 102 of the cell 100 can go back up to the input/output contacts produced in the upper interconnection levels formed above the cell 200.

Given that the height H of the cells 100 and 200 is identical, and the free spaces e are kept at the cells intended to be formed in the upper level, the region reserved for the active zones of the cells 200, with height $H_{actSup}$, is smaller than that available for the active zone of the cell 100, with height $H_{actInf}$, which corresponds substantially to $H_2$. Furthermore, in the cell 200, between the active zones, there is no space reserved for the connection elements intended to be connected to the input/output contacts, which offers additional space savings for the production of active zones in the cells formed in the lower level.

It is thus clear that it would be wise to arrange the most bulky standard cells, i.e. those corresponding to the most complex electronic devices, in the lower stack of layers, and the less complex cells in the upper stack of layers.

The software for modeling the integrated circuit performs a place and route by arranging the standard cells next to each other in rows on a first level, corresponding to the first stack of layers, and by arranging other standard cells next to each other in rows on a second level, corresponding to the second stack of layers, superimposed on the first level.

Figure 8:
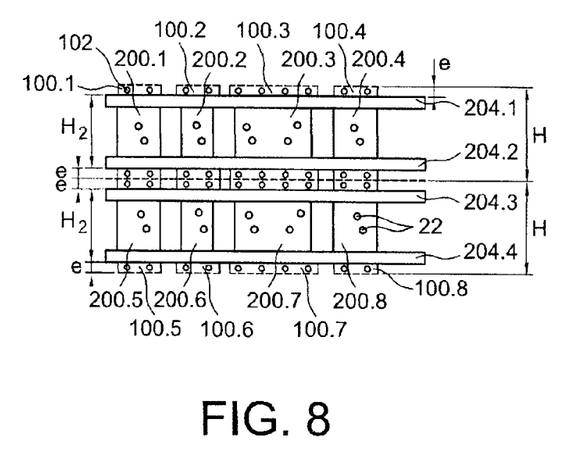
FIG. 8 diagrammatically shows rows of standard cells corresponding to a part of a multi-level integrated circuit according to a particular embodiment.

FIG. 8 shows an example of several standard cells similar to those previously described relative to FIG. 7 and corresponding to a portion of a multi-level integrated circuit. In FIG. 8, four first cells 200.1 to 200.4 are arranged side by side forming a first row, and four second cells 200.5 to 200.8 are arranged side by side forming a second row parallel to the first row. These standard cells 200.1 to 200.8 are arranged on an upper level and have a structure similar to the cell 200 previously described. Thus, by projecting all of the elements of the cells 200.1 to 200.4 in a same plane, these cells 200.1 to 200.4 have their different elements arranged between metal power lines 204.1 to 204.2 shared by all of the cells of the first row of cells. Likewise, the cells 200.5 to 200.8 have their different elements arranged between electrical power lines 204.3 and 204.4 shared by all of the cells of the second row of cells.

Moreover, as for the cell 200, the bulk of the cells 200.1 to 200.8, the occupation surface of which has a height $H_1$, is provided such that a free space e is kept between the metal power lines 204.1-204.4 and the upper and lower boundaries of the height H, this space allowing the connection elements 102 of standard cells 100.1 to 100.8 arranged under the cells 200.1 to 200.8, on a lower level, to go back up above the cells 200.1 to 200.8 to contact electrically conductive input/output contacts intended to be formed above the upper level.

FIG. 8 shows that the rows of cells 200.1 to 200.4 and 200.5 to 200.8 include electrical power lines 204.1 to 204.4 that are unique to each row of cells, in order to have the free spaces with heights equal to two times the space e between the rows of cells of the upper level. As in FIG. 2, the electrical power lines of each row of cells are shared by all of the cells in the row, these lines being produced without interruption along the entire row. Moreover, the electrical power lines 204.1 and 204.2 are also shared by the row of cells 100.1 to 100.4 arranged under the row of cells 200.1 to 200.4. The electrical power lines 204.3 and 204.4 are also shared by the row of cells 100.5 to 100.8 arranged under the row of cells 200.5 to 200.8.

In one alternative, it is possible for at least part of the electrical power lines to be shared by several rows of cells of a same level and adjacent to each other, similarly to the example previously described relative to FIG. 2. It would for example be possible for the set of cells 200.1 to 200.8 to be electrically connected to an electrical power line that would replace the lines 204.2 and 204.3 shown in FIG. 8. In this case, no connection element 102 goes back up between the two upper rows of cells, the set of connection elements 102 going up from the rows of the bottom level in that case being arranged on the outer sides of the rows, next to the power lines 204.1 and 204.4.

Figure 9:
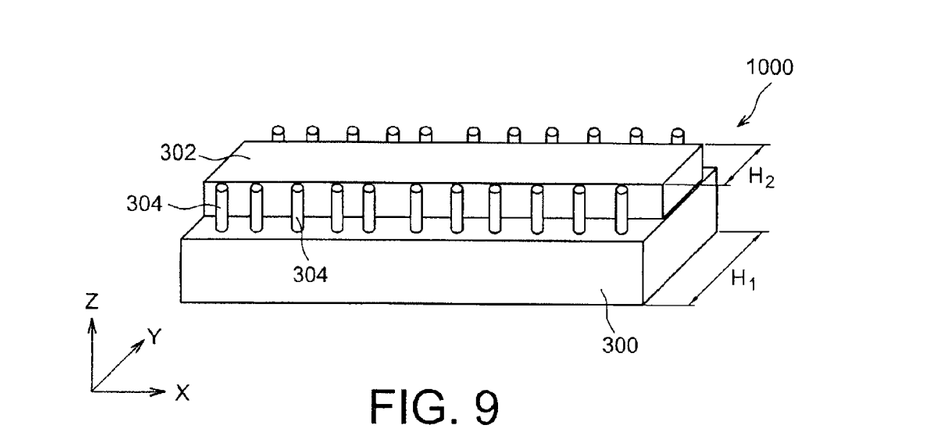
FIG. 9 diagrammatically shows two superimposed rows of standard cells corresponding to two superimposed rows of electronic devices of a multi-level integrated circuit according to a particular embodiment.

FIG. 9 diagrammatically shows the arrangement of two rows of electronic devices corresponding to two superimposed rows of standard cells, corresponding for example to the rows of cells 100.1 to 100.4 and 200.1 to 200.4 previously described, of the integrated circuit 1000. This FIG. 9 shows the volumes occupied in the two superimposed stacks of layers by the electronic devices 100.1 to 100.4 and 200.1 to 200.4 as well as the connection elements 102.

The first row of electronic devices corresponding to the cells 100.1 to 100.4 fits in a substantially parallelepiped rectangle shaped volume 300 including a main dimension parallel to the first direction (parallel to the x axis shown in FIG. 9) corresponding to the direction in which said first row of devices extends. The dimension of this volume 300 along the y axis corresponds to the height $H_1$.

The second row of electronic devices corresponding to the cells 200.1 to 200.4 fits in a substantially parallelepiped rectangle shaped volume 302 arranged above the volume 300. The volume 302 also includes a main dimension parallel to the first direction (parallel to the x axis shown in FIG. 9) corresponding to the direction in which said second row of devices extends. The dimension of said volume 302 along the y axis corresponds to the height $H_2$, which is smaller than the height $H_1$.

The connection elements 102 electrically connect the inputs and outputs of the electronic devices of the first row to input/output contacts intended to be arranged on the second stack of layers, therefore passing through the second stack of layers and each fitting into a volume 304 of the second stack of layers such that said third volume 304 is arranged in the volume 300 of the electronic devices of the first row and next to the volume 302 of the electronic devices of the second row.

FIG. 9 shows that the volume 302 in which the second electronic devices fit is centered (on the y axis) relative to the volume 300 delimited by the first electronic devices. Thus, the connection elements 102 are arranged on either side of the volume 302.

We will now describe the software conception of a multi-level integrated circuit according to a particular embodiment including rows of electronic devices manufactured on two levels (one level corresponding to a stack of layers as explained previously, each stack including a semiconductor layer). The method uses a dedicated library of standard cells.

Figure 10:
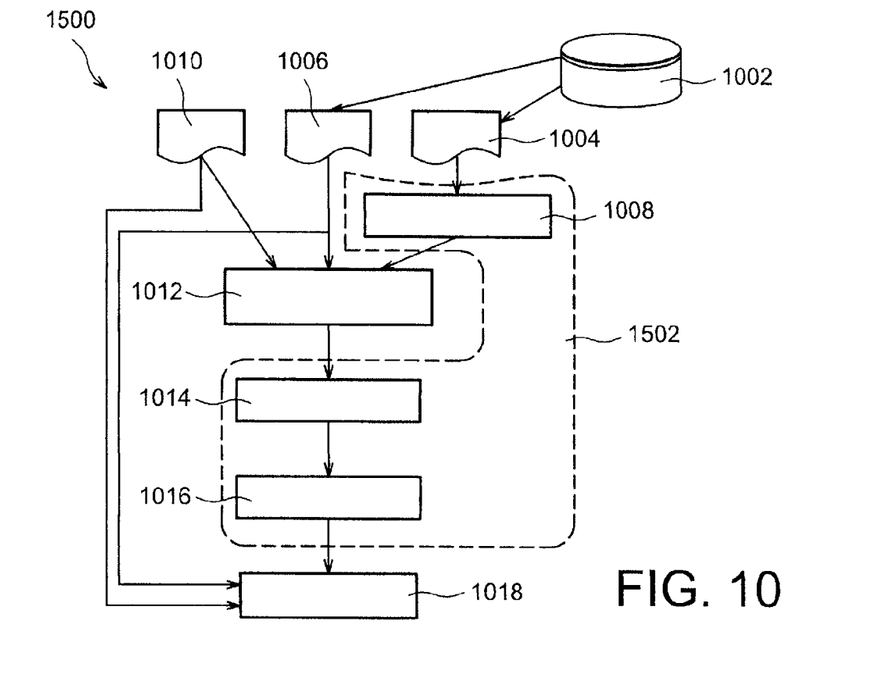
FIG. 10 shows different implementation steps during the modeling of a multi-level integrated circuit.

FIG. 10 shows the different steps which can be carried out in such a software conception method 1500 in order to define a multi-level integrated circuit.

The library of standard cells, referenced 1002 in FIG. 10, includes 2 sets of 2D standard cells. The integrated circuit is intended to be produced on two levels and the library includes at two different physical descriptions for most or all of the cells. One description corresponds to a version of the cell manufactured in a lower level, called "2D bottom version". The electronic components of this 2D bottom version are all made on or inside the bottom semiconductor layer and can have a structure similar to that of the cell 200 represented on FIG. 7. The other description corresponds to another version of the same cell manufactured on an upper level and called "2D top version". The electronic components of this 2D top version are all made on or inside the top semiconductor layer and can have a structure similar to that of the cell 100 represented on FIG. 7.

The library can also include another version of one or more standard cells manufactured on two levels, called "3D version", which can have a structure similar to that of the cell 30 previously described (e.g. including its transistors of a first type of conductivity manufactured on or inside the bottom semiconductor layer and its transistors of a second type of conductivity manufactured on or inside the top semiconductor.

The physical and electrical information for the standard cells are stored in different files, respectively: one or several first LEF ("Library Exchange Format") files 1004, and one or several LIB files 1006, giving information on timings. For each version of the cell, the surface occupied and its boundary (projected on a plane), the position of the inputs/outputs and the surfaces occupied in each layer of materials by the components of the cell are described in the LEF file(s) 1004.

From the information contained in the LEF file 1004, the software will first generate, for each 2D versions of the standard cells, a new LEF file, for example called LEF*, in which some or all of the surfaces defined in the LEF file 10004 are reduced by a factor k>1, with k=2 for example (step referenced 1008). This reduction can for example be done by dividing the initial height or the initial width of the cells by k, or by diving the initial height and width of the cells by a factor √k.

For cells having two different 2D versions, the LEF* file can contain two reduced versions of the cell or only one reduced version of the cell. If two reduced versions are used, it is preferable that both versions of each cell, 2D top and bottom reduced versions, have the same boundary forms and dimensions. Besides, the boundary forms and dimensions of the initial 2D top and bottom versions of the cells can be made similar and defined based on the cell occupying the largest area (generally the 2D top version).

From the reduced versions of the, defined in the LEF* file, as well as the electrical information of the cells (LIB file 1006) and the RTL description file 1010 ("Registry Transfer Level") of the integrated circuit, a common placement software tool can be used, in step 1012, to place all the cells used in the circuit on a plane, on different rows. It will be noticed that the cells which are placed are reduced versions of the cells (LEF*). As well known, this placement can be determined in such a way that it optimizes the timing characteristics of the integrated circuit. At the end of this step 1012, a DEF ("Design Exchange Format") file is therefore obtained in which the positions of the cells are specified, for example by the coordinates defining the location of each of the cells, as well as the boundaries of each cell.

In a step 1014, the software makes a new transformation of the dimensions of the cells listed in the previously obtained DEF file, by increasing by factor k the previously reduced surfaces of the cells. The software therefore generates a new DEF file, e.g. called DEF*, in which the positions of the cells are specified as well as the new areas occupied by each cell. This increase of the surfaces can be done in one direction, by increasing the height or the width, or can be done in 2 directions, by increasing both the height and the width. For example, when only the width is increased by factor k, the position of the middle point of the overall surface of the cell defined by its boundary can be kept unchanged.

After this increase of the dimensions of the surfaces of the cells, most of the cells will overlap. Thus, in a step 1014, the software distributes the cells of the circuit on both levels, top and bottom. This distribution is done by trying to minimize the overlap areas between the adjacent cells of a same level. This distribution results in the creation of two new distinct DEF files, one for each level: DEFtop and DEFbottom.

From the two DEF files, DEFtop and DEFbottom, obtained after carrying out step 1016 and the information contained in the RTL 1010 and LIB 1006 files, a last step 1018 refines the placement of the cells located on a same level in order to eliminate any overlap between the cells. This distribution again results in the creation of two distinct DEF files, one for each level. These two DEF files are then grouped together in a single DEF file including the information relative to the layout of the "front-end" portion of the circuit. After these placement steps, a routing step, using standard routing tools, can be performed in order to define all the interconnections between the cells of the integrated circuit. These interconnections will constitute what is called the back-end portion of the circuit. These interconnections are generally made of conductive lines and vias placed in many different dielectric layers.

After that, it is possible to generate the final computer files (e.g. of the "gds2" type) which will be used to prepare the masks for the manufacturing of the integrated circuit.

It will be noticed that the steps corresponding to references 1008, 1014 and 116 can be carried out by existing place-and-route software tools with no modification, or very minor modification of these tools. Indeed, the software conception method previously described includes "new" steps 1008, 1014 and 1016 in which new files (LEF*, LEFtop, LEFbottom) are generated, theses files being written in a standard format which can be understood by existing tools. An advantage of this software conception method is then that it does not require at lot of software development. However, it will be noticed that more 3D dedicated software tool could be developed in order to place the cells of the circuit directly on two levels.

In the examples previously described, the integrated circuit is designed on two levels. However, the principles previously explained can also be applied to produce integrated circuits on more than two levels, with superimposition of standard cells with decreasing heights according to the level on which the cells are placed.

Figure 11:
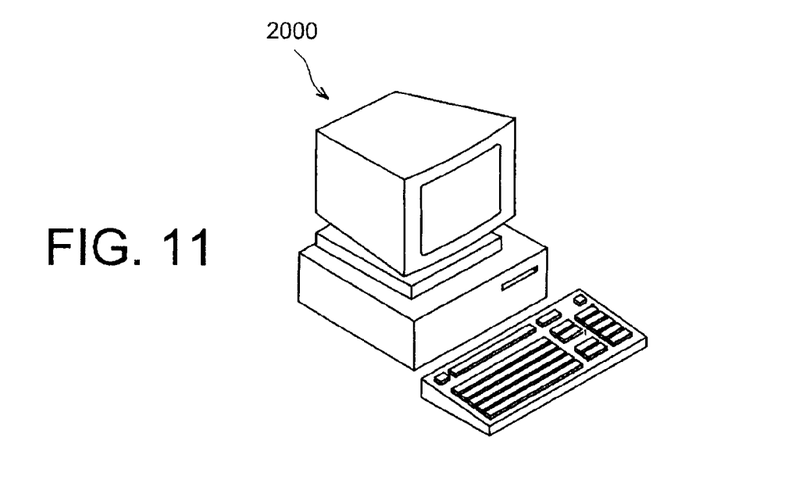
FIG. 11 shows a computer device capable of modeling a multi-level integrated circuit.

The software conception method according to the invention can be executed on one or more computers 2000 or similar tools, as shown on FIG. 11.

The invention claimed is:

1. A multi-level integrated circuit comprising a superposition of at least a first and second stacks of layers of materials, and including at least:
   a first row of first electronic devices realized in the first stack, the first row extending parallel to a first direction and fitting into a first volume with a substantially parallelepiped rectangle shape corresponding to a portion of the first stack and having, in a first plane parallel to a contact surface between the first stack and the second stack, edges perpendicular to the first direction and with dimension $H_1$;
   a second row of second electronic devices realized in the second stack, the second row extending parallel to the first direction and fitting into a second volume with a substantially parallelepiped rectangle shape corresponding to a portion of the second stack, placed on the first volume and having, in said first plane, edges perpendicular to the first direction and with dimension $H_2$ smaller than $H_1$; and
   a plurality of electrical connection elements electrically connecting inputs and outputs of the first electronic devices of the first row to electrically conductive input/output contacts arranged above the second stack, passing through the second stack of layers, each connection element fitting into a third volume corresponding to a portion of the second stack and being placed on the first volume next to the second volume.

2. The integrated circuit according to claim 1, wherein second volume is centered relative to the first volume and wherein the electrical connection elements are placed on each side of the second volume, along edges of the second volume parallel to the first direction.

3. The integrated circuit according to claim 1, wherein the electrical connection elements are arranged on a single side of the second volume, along an edge of the second volume parallel to the first direction.

4. The integrated circuit according to claim 1, wherein at least one electronic device of each row is capable of performing a logic operation and/or storing data.

5. The integrated circuit according to claim 1, wherein each stack of layers of materials comprises at least one semiconductor layer and a dielectric layer placed above the semiconductor layer.

6. The integrated circuit according to claim 1, wherein at least one electronic device of each row includes at least one active zone formed in a semiconductor layer of the stack of layers in which it is realized.

7. The integrated circuit according to claim 1, wherein at least one electronic device includes at least one electrically conductive portion forming an internal electrical connection between at least two electrical components of said electronic device and placed in a dielectric layer of the stack of layers in which the electronic device is realized.

8. The integrated circuit according to claim 1, also including electrical power lines arranged in the second volume and in a dielectric layer of the second stack of layers, each of the electronic devices of the first and second rows being electrically connected to said electrical power lines, said electrical power lines extending parallel to the first direction, near the edges of the second volume parallel to the first direction.

9. The integrated circuit according to claim 1, wherein each of the inputs and outputs of the second electronic devices of the second row is electrically connected to at least one electrically conductive input/output contact arranged above the second stack, via a connection element passing through at least one dielectric layer of the second stack.

10. The integrated circuit according to claim 1, also including at least one third electronic device including at least one elementary electronic component placed in the first volume and at least one elementary electronic component placed in the second volume.

11. The integrated circuit according to claim 1, including a plurality of parallel first rows of electronic devices and a plurality of parallel second rows of electronic devices, each of the second volumes in which the second rows of electronic devices fit being placed on one of the first volumes in which the first rows of electronic devices fit.

12. The integrated circuit according to claim 11, wherein at least part of the electronic devices of two second rows adjacent to each other are electrically connected to a same electrical power line.

13. The integrated circuit according to claim 1, also including one or several levels of electrical interconnections placed above the second stack and electrically connecting first and/or second electronic devices to one another.

14. A software conception method of a multi-level integrated circuit according to claim 1, using a standard cells library defining a first version of at least one cell for which the components are placed in a first stack of layers, and a second version of at least one cell for which the components are placed in a second stack of layers, all cells having at least one physical description defining a boundary of the cell in a plane, all versions of one cell corresponding to electronic components having a same functionality;

comprising at least the following steps of:
a—reducing, by a factor k superior to 1, an initial surface of each standard cell defined by its boundary;
b—placing on a plane in at least one row, cells corresponding to the electronic devices of the integrated circuit using a reduced surface of the standard cells;
c—extending, by factor k, the surfaces of the cells previously placed; and
d—distributing the cells on different levels of the multi-level integrated circuit in at least one first row of cells in the first stack and at least one second row of cells in the second stack.

15. The method according to claim 14, wherein the distribution of the cells on the different levels includes a step of detection of overlaps between neighboring cells, and distribution of neighboring cells overlapping on different levels.

16. A computer program product storing executable code for implementing at least one of the steps a, c or d of the method of claim 14.

17. A conception device of a multi-level integrated circuit, including software tools that can implement at least one of the steps a, c or d of the method of claim 14.

18. A method for manufacturing a multi-level integrated circuit in a superposition of at least a first and second stack of layers of materials, including at least the following steps:

manufacturing a first row of first electronic devices in the first stack, the first row extending parallel to a first direction and fitting in a first volume with a substantially parallelepiped rectangle shape corresponding to a portion of the first stack and having, in a first plane parallel to a contact surface between the first stack and the second stack, edges perpendicular to the first direction and with dimension $H_1$;

manufacturing a second row of second electronic devices in the second stack, the second row extending parallel to the first direction and fitting into a second volume with a substantially parallelepiped rectangle shape corresponding to a portion of the second stack, placed on the first volume and having, in said first plane, edges perpendicular to the first direction and with dimension $H_2$ smaller than $H_1$; and manufacturing a plurality of electrical connection elements electrically connecting inputs and outputs of the first electronic devices of the first row to electrically conductive input/output contacts placed above the second stack, passing through the second stack of layers, each connection element fitting into a third volume corresponding to a portion of the second stack and being placed on the first volume next to the second volume.

\* \* \* \* \*